United States Patent [19]

Forgo et al.

[11] 4,287,106

[45] Sep. 1, 1981

[54] ADHESIVE OR ADHESIVE COMPONENT CONTAINING CHLOROSULFONATED AMIDE OR IMIDE

[75] Inventors: Imre Forgo, Birsfelden; Abdul-Cader Zahir, Oberwil, both of Switzerland; Jacques Francois, Huningue, France

[73] Assignee: Ciba-Geigy Corporation, Ardsley, N.Y.

[21] Appl. No.: 66,355

[22] Filed: Aug. 13, 1979

[30] Foreign Application Priority Data

Aug. 16, 1978 [CH] Switzerland .......................... 8693/78
Nov. 2, 1978 [CH] Switzerland ........................ 11293/78
Feb. 8, 1979 [CH] Switzerland .......................... 1242/79

[51] Int. Cl.³ ...................... C08L 51/04; C08F 279/02
[52] U.S. Cl. ............................. 260/28.5 B; 260/42.47; 260/45.95 R; 525/256; 525/259; 525/261; 525/301; 525/305; 525/310; 525/282; 525/296
[58] Field of Search ............... 525/256, 259, 374, 375, 525/261, 263, 301, 305, 310, 282, 296

[56] References Cited

U.S. PATENT DOCUMENTS

| | | | |
|---|---|---|---|
| 2,845,403 | 7/1958 | Gumberg | 525/256 |
| 2,989,504 | 6/1961 | Little | 525/375 |
| 3,773,702 | 11/1973 | Ohashi | 260/31.2 N |
| 3,832,274 | 8/1974 | Owston | 161/183 |
| 3,890,407 | 6/1975 | Clayton et al. | 260/878 R |
| 3,928,286 | 12/1975 | Aklyama et al. | 260/474 A |
| 4,126,504 | 11/1978 | Wolinski et al. | 156/310 |
| 4,182,644 | 1/1980 | Briggs et al. | 156/310 |

FOREIGN PATENT DOCUMENTS 1077083 7/1967 United Kingdom .

OTHER PUBLICATIONS

Chem. Abstract, 80, 133070w, (1974)-Malieimidoarylsulfonyl Chlorides, Biba et al.

*Primary Examiner*—Carman J. Seccuro
*Attorney, Agent, or Firm*—Harry Falber

[57] ABSTRACT

The adhesive or adhesive component according to the invention, which contains a vinyl monomer, a vinyl polymer, a compound producing free radicals, and, as an adhesion promoter, an acid amide or imide which is substituted on the nitrogen atom by a chlorosulfonated alkyl, aryl or aralkyl group, forms, together with an amine accelerator, an adhesive with which heat-, oil- and water-resistant bonds, for example of metals, polymeric materials, glass and ceramics, having very high tensile shearing strength can be obtained. The adhesive can also be converted into the form of a dried sheet, with or without carrier, and in this form can be used for bonding.

15 Claims, No Drawings

ADHESIVE OR ADHESIVE COMPONENT CONTAINING CHLOROSULFONATED AMIDE OR IMIDE

The invention relates to an adhesive or adhesive component which contains a polymerisable vinyl monomer, a vinyl polymer, a compound producing free radicals, and, as an adhesion promoter, an acid amide or imide which is substituted on the nitrogen atom by a chlorosulfonated alkyl, aryl or aralkyl group. It also relates to the use of the adhesive or adhesive component for bonding two surfaces.

From the German Offenlegungsschrift No. 2,337,049 is known an adhesive composition as a two-part system based on polymerisable vinyl monomers, for example methyl methacrylate, and polymerisation catalysts. The aim is, by the addition of chlorosulfonated polyethylene or mixtures of sulfonyl chloride and chlorinated polyethylene, to overcome the shortcomings of known adhesive compositions based on polymerisable vinyl monomers, namely, the poor storage stability, the frequently long curing times, the inadequate bond strength and the necessity for the absence of air. After the bonding of two surfaces, with the curing time being very short as a result of the addition of an accelerator, there are obtained bonds which have a high tensile shearing strength, which however do not satisfy the requirements at higher temperatures (above 50° C.), or the requirements with regard to adhesion on oily surfaces or their behaviour under water. Furthermore, an improvement of storage stability is not ensured in all cases.

Similar adhesive compositions are described in the German Offenlegungsschrift No. 2,525,099. Instead of using chlorosulfonated polyethylene, there are used other chlorosulfonated polymers, or polymers together with low-molecular organic sulfonyl chlorides. Mentioned as such are alkyl- and arylsulfonyl chlorides, such as methane-, butane-, tridecane-, 2-naphthalene- or p-toluenesulfonyl chloride, or diphenyl ether-4,4'-disulfonyl chloride. As far as they have been tested, these compositions do not have however the tensile shearing strength required.

The use of similar adhesives in the form of unsupported sheets, or as a film on a carrier material, is likewise already known, for example from the German Auslegeschrift No. 2,524,197.

It was not to be anticipated that by the use of chlorosulfonated alkyl- or arylmaleimide in adhesives based on vinyl monomers and on not particularly reactive vinyl polymers the stated shortcomings could be overcome. It is however possible to obtain with this adhesion promoter bonds which are resistant to heat, oil and water and which have a high tensile shearing strength.

The invention relates therefore to an adhesive or adhesive component containing 30 to 80 percent by weight of at least one polymerisable vinyl monomer and 10 to 50 percent by weight of at least one vinyl polymer, as well as 0.05 to 10 percent by weight of a compound producing free radicals, which adhesive or adhesive component contains, as adhesion promoter, 0.1 to 15 percent by weight of an acid amide or imide which is substituted on the nitrogen atom by a chlorosulfonated alkyl, aryl or aralkyl group, and which corresponds to the formula I

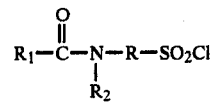

in which R is an alkylene group having 1 to 25 carbon atoms, or a substituted or unsubstituted phenylene, naphthylene or phenylenealkylene group having 1 to 4 carbon atoms in the alkylene moiety, $R_1$ and $R_2$ are each hydrogen or an alkyl group having 1 to 4 carbon atoms, or $R_1$ and $R_2$ together with the given

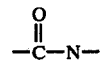

group form a heterocyclic ring which can be saturated or unsaturated and can be substituted by 1 or 2 methyl groups and which, in addition to the N atom given in the formula I, contains no further hetero atom in the ring, with the percentage values being calculated relative to the adhesive or adhesive component. Preferably, $R_1$ and $R_2$ together with the group

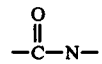

form the maleimide group, which can be further substituted by 1 or 2 methyl groups, and R is the phenylene group but also the o- or p-tolylene group.

Vinyl monomers preferably used are: methyl or ethyl acrylate, methyl, ethyl, butyl or hydroxyethyl methacrylate, glycidyl methacrylate, styrene, chlorostyrene, 2-chloro-1-3-butadiene and/or 2,3-dichloro-1,3-butadiene.

Suitable vinyl polymers are above all the polymers which are not particularly reactive, such as acrylonitrilebutadiene-styrene terpolymers (ABS polymers in pulverulent or granular form), butadiene-styrene copolymers, isoprenestyrene copolymers, polystyrenes and/or chlorinated polyethylenes; and also polybutadienes, polyisoprenes, unsaturated polyesters (alkyd resins), such as those formed from maleic anhydride and polyethylene glycol, or from fumaric acid and diglycidyl ether of bis-phenol A (having acrylic groups in the terminal position).

The compounds producing free radicals are for example: organic peroxides, hydroperoxides, peresters or peracids, especially cumene hydroperoxide or benzoyl peroxide. Their amount is preferably 0.05 to 3 percent by weight, relative to the adhesive component.

The adhesive or adhesive component preferably contains additional substances which can further improve the properties of the bonds, and improve the handling during bonding or the rate of bonding.

Among these additional substances are in particular the following:

(a) adhesion promoter in an amount of 5 to 20 percent by weight, relative to the adhesive or adhesive component, particularly methacrylic acid;

(b) crosslinking agent, 0.1 to 10 percent by weight, especially up to 5 percent by weight, that is to say, compounds having several functional groups, such as dimethacrylates, for example 1,3-butylene glycol dimethacrylate, ethylene glycol dimethacrylate, polyethylene glycol dimethacrylate or divinyl benzene;

(c) vaporisation inhibitor, 0.1 to 10 percent by weight, particularly 1 to 10 percent by weight, for example chlorinated paraffins with 30–70, especially 50–60, percent by weight of chlorine;

these substances serve to extend the so-called open time, that is, the time between the application of the adhesive or adhesive component to the surfaces to be bonded and the joining together of these surfaces;

(d) stabiliser (antioxidant) for extending the storage stability of the adhesive or adhesive component, 0.1 to 10 percent by weight, occasionally only 0.1 to 2 percent by weight, with hydroquinone, quinone or 2,6-di-tert-butyl-p-cresol (Jonol) being suitable; in the case of one-component adhesives, that is, systems which are cured hot, no stabiliser should be added because apparently a reaction between the peroxides and the stabiliser occurs, which can prevent hot curing;

(e) mono- or dicarboxylic acids, 0.1 to 10 percent by weight, which are used partially as further additives, partially in place of acrylate, improve the adhesive bond; they are preferably p-toluenesulfonic acid, tartaric acid, maleic acid, fumaric acid, glutaric acid and succinic acid;

(f) adhesion promoter, 0.1 to 10 percent by weight, particularly up to 2 percent by weight, with silanes being suitable, for example γ-methacryloxypropyl-trimethoxy silane;

(g) epoxide resin, 0.1 to 10 percent by weight, for improving the adhesive action: known liquid epoxide resins based on bisphenol-A are suitable;

(h) pigments, 0.1 to 10 percent by weight, serve to render more visible the surfaces coated with the adhesive or adhesive component: knonw inorganic or organic pigments can be used; and (i) addition of polyalkylene powder, for example polyethylene, effects an improvement of adhesion on polyalkylene sheets.

For bonding two surfaces, the adhesive or adhesive component according to the invention, which can contain one or more of the additives listed above, is used without an accelerator or together with an accelerator (so-called two-component system).

In the first case, the adhesive is applied to one or both of the surfaces to be bonded, and the two parts are then left open for 15 minutes to 1 hour (or in the case of steel parts they are immediately joined together); after the open time, the two surfaces are pressed together and heated for several minutes to several hours at a temperature of 80° to 250° C. It may be advantageous to leave the bonded article for a few minutes to several hours at room temperature before heating.

When the heating is carried out by means of high frequency heating (for example by means of an HF industrial generator dielectrically, 500 W, Hasler AG, Berne), it is possible on the one hand to considerably shorten the bonding time and on the other hand to extend the so-called "open time" (see below).

With use of the adhesive as a one-component system, that is to say, without the addition of an accelerator, the bonding process preferably comprises applying the adhesive to the surfaces to be bonded, leaving the coated parts open for 15 minutes to several hours, joining them together, and subsequently performing the curing operation for one hour at about 100° C. or for a few minutes in a high-frequency oven. The disadvantage constituted by the curing temperature being higher than that involved with use of a two-component system (2nd component is an accelerator) is counterbalanced by the longer "open time". By "open time" is meant the length of time during which the adhesive applied to the substrate can remain open without loss of its binding property. The reason for the longer open time is that the layer can be applied somewhat more thickly than it can be applied in the two-component system, and the outer surface layer prevents the air affecting the deeper lying parts of the coating, with the result that the underneath layer can remain active for a longer period of time. Furthermore, the one-component system has the advantage that it is more simple to apply.

The adhesive as a one-component system can advantageously be processed into the form of adhesive film or sheet, with or without a supporting base or carrier.

For producing a film with carrier, the liquid adhesive according to the invention can be applied to a substrate, for example a glass fibre fleece or an acrylate fleece, and then dried. The films are virtually or completely odorless and no longer feel tacky. The coating can be put onto both sides of the carrier by a double application, whereupon the films are dried for one hour at room temperature or for several minutes (5–10) in a cold stream of air.

When unsupported films or sheets are to be produced, the adhesive according to the invention is converted into a film form by being poured onto a substrate, for example a polyethylene sheet, and then dried at room temperature. Films or sheets of this kind can also be produced by extruding or calendering the adhesive. The films or sheets are colourless, but they can be provided with a desired shade of colour by an addition of dye or pigment to the adhesive.

Compared with the films or sheets described in the German Offenlegungsschrift No. 2,429,378, those produced from the resin mixtures according to the invention are characterised by having in general lower curing temperatures (curing in a short time already at 80°–90° C.) and better adhesive properties with regard to peel strength.

Accelerators which can be used in the two-component systems are secondary or tertiary amines, and also a condensation product from a primary or secondary amine and an aldehyde, preferably N,N-dimethylaniline or N,N-dimethyl-p-toluidine, or a condensation product from 1 mol of aniline or butylamine and 3 mols of butyraldehyde. A number of suitable accelerators are described in the U.S. Pat. No. 3,591,438. Bonding can be effected by firstly providing one or both of the surfaces, which are to be bonded, with the accelerator, and then one or both surfaces with the adhesive component, and subsequently bringing the surfaces together. In order to be able to distinguish it better from the adhesive component, the accelerator can contain a coloured pigment. It is also possible to spray the accelerator onto both surfaces to be bonded, which have already been provided with the adhesive.

After 5 minutes to 1 hour, there are obtained bonds having tensile shearing strength values of 10 to 20 N/mm$^2$; after 24 hours, values of over 30 N/mm$^2$ can be measured.

Another method is to add the accelerator to the adhesive component shortly before the bonding operation, and to then apply the adhesive mixture to one or both of the surfaces to be bonded. It is merely to be ensured that the time between mixing and bonding is sufficient for the adhesive mixture to remain adhesive.

The amount of accelerator can be up to 50 percent by weight, relative to the adhesive component, preferably 0.1 to 5 percent by weight.

Suitable surfaces for bonding are those of metals, such as steel, aluminium and its alloys, for example with magnesium and silicon, copper and its alloys, so-called "Zincrometall" (a zinc-chromium alloy), or surfaces of polar polymeric materials, such as polyamides, polyurethanes, polyesters, glass-fibre-reinforced plastics, wood, glass, ceramics or paper, and surfaces which are provided with coatings. It is possible with the twocomponent system to also perform bonding operations under water, for example of steel with steel or of concrete with steel. In such cases, the use of higher-viscous accelerators, such as amine-aldehyde products, is of particular interest. In admixture with polyalkylene powder, the adhesives according to the invention are also suitable for bonding pretreated polyethylene sheets.

The adhesive or adhesive component can also be used for the bonding of two unlike materials, for example the bonding of metals with coating sheets. It is advantageous in this case to use a one-component system according to the invention, with which firstly a film is produced on the coating sheet to be bonded, which consists for example of a polyester. The dried article can be stored in the rolled-up form at room temperature and can be transported, and it loses its adhesive strength only very slowly; on storage in a refrigerator, it retains its initial adhesive strength for months. It is subsequently applied to the metal surface and cured and bonded at elevated temperature.

Adhesive sheets, with or without carrier, are especially suitable for bonding metal surfaces. The sheets are placed between the surfaces to be bonded; these are then pressed together, for example with the aid of clamps, and are held for at least 15 minutes at a temperature of 80° to 100° C.

The maleimides, on which are based the substances of the formula I in which $R_1$ and $R_2$ together with the group

form the maleimide group, which maleimides can be further substituted by 1 or 2 methyl groups, can be produced in a known manner, for example according to the U.S. Pat. No. 2,444,536, or according to the German Offenlegungsschrift No. 1,934,791. The imides thus produced are then chlorosulfonated, for example by reacting them with chlorosulfonic acid. Thus, N-arylmaleimide reacts with this acid in excess, at room temperature, with high yield and within a few hours to chlorosulfoaryl-maleic imide.

The production of some adhesion promoters is described in the following:

(a) Chlorosulfonated 1-naphthyl-N-maleimide 39.6 g (0.404 mol) of maleic anhydride and 110.0 g of methylene chloride are placed into a 750 ml sulfonating flask, and dissolved with gentle heating (solution No. 1). 57.2 g (0.4 mol) of 1-naphthylamine is dissolved in 50 g of methylene chloride, and this solution is slowly added dropwise to solution No. 1. The reaction is exothermic. After the addition of the naphthylamine solution, the formed suspension is cooled to 20° C., and 61.4 g of acetic anhydride are slowly added dropwise, in the course of which the solution becomes viscous. There is afterwards added dropwise 0.42 g of cobalt naphthenate and subsequently 20.2 g of triethylamine, the reaction being exothermic. The temperature is adjusted to 35° C. with ice-water cooling, and the reaction mixture is stirred at 35° C. for 3½ hours. The solvent is then removed in a rotary evaporator without heating, and to the residue is added 20 ml of ice water with stirring. The mixture is left to stand overnight in a refrigerator, and the product crystallises out. The crystals are washed on the suction filter twice with 100 ml of ice water each time; they are then filtered and dried. The product is finally recrystallised from 10 ml of acetone to yield 64 g (71%) of crystalline product having a melting point of 115° C.

The elementary analysis agrees with the following formula:

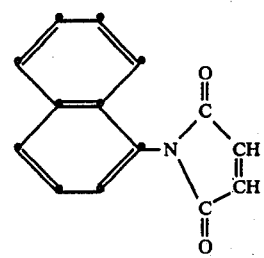

87.38 g (0.75 mol) of chlorosulfonic acid is placed into the reaction vessel and cooled to 10° C. 22.5 g (0.1 mol) of 1-naphthylmaleimide is dissolved in 58 g of methylene chloride, and the solution is added dropwise, with vigorous stirring, to the chlorosulfonic acid, the addition taking about 1½ hours. The cooling bath is afterwards removed, and the solution is stirred for 4 hours at room temperature. 100 ml of water together with 150 g of acid is placed into a 1 liter beaker, and, with vigorous stirring, the chlorosulfonic acid solution is now added at 0° C. in 25 minutes, with a light-coloured suspension being formed. After stirring for half an hour, there is added 130 ml of $CH_2Cl_2$ and the mixture is stirred for 10 minutes. The mixture is afterwards separated in a separating funnel, and the aqueous phase is extracted twice with 50 ml of $CH_2Cl_2$ each time. The combined $CH_2Cl_2$ phases are extracted again twice with 50 ml of water each time, subsequently separated, and dried over $Na_2SO_4$. The solvent of the clear solution is removed without heating in a rotary evaporator. The residue crystallises out to yield about 19 g of product; melting point: 184°–186° C.

The elementary analysis and the mass spectrum agree with the following formula:

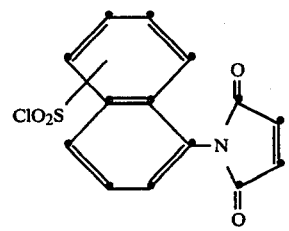

(b) Chlorosulfophenylsuccinimide 40.0 g of succinic anhydride (0.4 mol), 110.0 g of methylene chloride, 37.2 g of aniline (0.4 mol), 61.4 g of acetic anhydride (0.6 mol), 0.42 g of cobalt naphthenate and 20.2 g of triethylamine (0.2 mol) are processed in a 750 ml sulfonating flask, fitted with stirrer, thermometer, dropping funnel and heating and cooling bath, as follows: The aniline is added dropwise, with stirring and exothermic reaction, to the succinic anhydride and methylene chloride, the addition being completed after ¾ of an hour; the reaction mixture is then stirred for 1 hour at about 42° C. After cooling to room temperature, there is added dropwise to the mixture, in a quarter of an hour, the acetic anhydride, and afterwards are added firstly the cobalt compound and subsequently the triethylamine. The colour becomes violet, and the mixture goes into solution with a slight exothermic reaction. The temperature is held for 3 hours at 35° C., and the mixture is then left to stand overnight. It is afterwards concentrated in a rotary evaporator without heating: the product crystallises out. 20 g of ice is added to the reaction product, and the flask is allowed to stand for 1 day in the refrigerator. The product is then filtered, washed with ice water and dried. The product is recrystallised from acetone to yield 60.0 g (86% of theory); melting point: 153° C.

Elementary analysis: calculated: C 68.56% H 5.18% N 7.99%. found: C 68.50% H 5.10% N 8.0%.

8.75 g (0.05 mol) of the product (N-phenylsuccinimide) is slowly added to 44 g (0.38 mol) of chlorosulfonic acid. The mixture goes into solution with an exothermic reaction. The solution is stirred for 5 hours at 60° C., in the process of which it turns dark-coloured. The contents of the flask are slowly added dropwise to 100 ml of water together with 150 g of ice. After about half an hour, 100 ml of methylene chloride is added to the mixture; the mixture is stirred for 10 minutes and the methylene chloride phase is separated. The base mixture is extracted twice with 20 ml of $CH_2Cl_2$ each time, and then separated. The combined methylene chloride phases are washed twice with 20 ml of water each time, and subsequently separated. The methylene chloride phase is dried on $Na_2SO_4$, filtered, and concentrated in the rotary evaporator. The product melts at 190°–193° C. (crystallisation from acetone).

Analysis: calculated: C 43.89% H 2.95% N 5.12% S 11.71% Cl 12.95%. found: C 42.5% H 3.0% N 4.9% S 11.8% Cl 12.3%.

(c) Chlorosulfobenzylmaleimide

In the apparatus mentioned under (b), 87.4 g (0.75 mol) of chlorosulfonic acid and 18.7 g (0.1 mol) of benzylmaleimide are mixed together for 5 hours at 60° C. The solution is afterwards added dropwise to ice water, and the mixture is stirred for 30 minutes. The mixture is then extracted with methylene chloride as described under (b). The initially liquid product slowly crystallises on standing.

EXAMPLE 1

35 g of ABS powder is dissolved at room temperature (RT) in a mixture of 54 g of methyl methacrylate and 10 g of methacrylic acid. To the homogeneous emulsion is added 2 g of p-chlorosulfophenyl-maleimide, and stirring is continued for 2 hours. An addition of 1 g of ethylene glycol dimethacrylate is subsequently made, and the mixture is stirred at RT for 3 hours. There is finally added 0.5 g of cumene hydroperoxide, and the mixture is stirred for a further 3 hours and then removed from the reaction vessel. The Brookfield viscosity of this mixture designated by A is 122 Pa s (spindle No. 6, 10 r.p.m.).

A portion of the mixture is used for bonding two metal strips. The specimens have an overlap of 12.5 mm×25.0 mm. The one specimen consists of 2 steel strips, the other of 2 strips of an Al-Mg-Si 1 alloy (Mg:0.6–1%, Si: 0.7–1.3%, Mn: 0–0.5%), obtainable for example under the trade name of Anticorodal 100 B, Schweiz. Aluminium AG, denoted in the following by the abbreviation "Al.alloy".

The adhesive compounds are produced by thinly applying the previously described mixture onto a metal strip. To the other metal strip is applied a known accelerator consisting of 3 mols of butyraldehyde and 1 mol of aniline (Acc. 1) (for example "Accelerator 808", Du Pont). Immediately after being coated, the two strips are pressed together, fixed with clamps and then cured.

The tensile shearing strengths, which are obtained after curing of the mixture A at RT for 24 hours with various substrates, are set out in Table 1.

TABLE 1

| Substrate | | Mixture A Tensile shearing strength (N/mm²) |
|---|---|---|
| Al. alloy | ground | 21.9 |
| Al. alloy | etched | 25.4 |
| steel | ground | 24.2 |
| steel | degreased | 22.2 |
| steel | oiled | 19.1 |

In the following Tables 2–4, the tensile shearing strength in N/mm² of several bonds according to this Example is given as a function of the curing time (Table 2), of the test temperature (Table 3) and of a postcuring temperature (Table 4); there is also given the tensile shearing strength after storage in water and with bonding of oily metal surfaces, and finally the so-called critical temperature; and there is concomitantly tested, as the comparison (V 1), a mixture according to German Offenlegungsschrift No. 2,337,049 of the following composition:

32.6 g of chlorosulfonated, branched-chain polyethylene,
46.6 g of ethyl methacrylate,
9.3 g of methacrylic acid,
0.5 g of 2,6-di-tert-butyl-p-cresol,
0.9 g of cumene hydroperoxide,
0.9 g of 1,3-butylene glycol dimethacrylate,
3.6 g of a pigment,
1.6 g of a liquid epoxide resin having an epoxide value of 5 Val/kg,
0.5 g of γ-methacryloxypropyldimethoxy silane.

TABLE 2

| Curing rate Al. alloy etched | Tensile shearing strength N/mm² | |
|---|---|---|
| Curing time at RT | A | V 1 |
| 5 min. | 10.6 | 14.3 |
| 15 min. | 15.0 | 13.7 |
| 30 min. | 17.2 | 19.3 |
| 1 h | 19.6 | 20.4 |
| 2 h | 20.4 | 21.6 |
| 24 h | 32.4* | 19.7 |

*The specimen used in this case is a similar Al-Mg alloy of a different origin.

TABLE 3

Tensile shearing strength as a function of the test temperature (temperature pattern)
Substrate: Al. alloy, etched
Curing: 24h/RT + 1 h at 100° C.

| Test temperature | Tensile shearing strength N/mm² | |
|---|---|---|
| | A | V 1 |
| −20° C. | 28.6 | 31.6 |
| 0° C. | 27.7 | 30.6 |
| 20° C. | 26.1 | 22.8 |
| 50° C. | 29.9 | 18.9 |
| 75° C. | 27.0 | 14.3 |
| 100° C. | 23.6 | 10.1 |
| 125° C. | 16.2 | 8.9 |

TABLE 4

Hot postcuring
Substrate: steel, ground
Curing: 24 h/RT + postcuring

| Curing 24 h/RT postcuring 1 h | Tensile shearing strength N/mm² | |
|---|---|---|
| | A | V 1 |
| 80° C. | 23.4 | 25.4 |
| 100° C. | 22.7 | 24.6 |
| 150° C. | 22.8 | 17.5 |
| 200° C. | 24.1 | 11.2 |

The tensile shearing strength of a specimen from an etched Al. alloy, which has been cured for 24 hours at room temperature and subsequently for one hour at 100° C., is after 7 days' storage in water at 40° C., at a test temperature of 75° C., 19.6 N/mm² using mixture A, and 12.0 N/mm² using mixture V 1. The tensile shearing strength of a specimen from oiled steel, which has been cured for 24 hours at room temperature, is 19.1 N/mm² using mixture A, and 10.8 N/mm² using mixture V 1.

Finally, a specimen from an etched Al. alloy, when tested to determine the short-time dimensional stability under heat, gives a critical temperature ($T_{K2}$ value) of 130° C. using mixture A, and 96° C. using mixture V 1. The critical temperature is the temperature at which a bonded specimen breaks apart under a specific tensile loading. It is a measure of the short-time dimensional stability under heat, and is measured on tensile shearing specimens (see DIN 53 283) having a 12 mm overlap as follows: the specimen is clamped in an oven and is subjected to a constant load of 4 N/mm². The temperature is then uniformly raised at a rate of 12° C. per hour until the bonded joint breaks. The breaking temperatures are denoted as critical temperatures.

As a further comparative test, there is applied to the one metal strip of a specimen of ground steel a mixture V 2 according to Example 27 of German Offenlegungsschrift No. 2,525,099, namely a mixture of 25 percent by weight of polychloroprene (marketed as "Neopren W"), 61 percent by weight of methyl methacrylate, 10 percent by weight of methacrylic acid, 3 percent by weight of a liquid bisphenol-A epoxide resin and 1 percent by weight of ethylene dimethacrylate, which contains to every 100 parts of polychloroprene 56 mmols of methanesulfonyl chloride, and to every 100 parts of the mixture 0.5 part of cumene hydroperoxide, and to the other metal strip "Accelerator 808" and the tensile shearing stress is measured after 24 hours at room temperature. No measurable adhesion is obtained.

EXAMPLES 2 to 10 (see also Table 5)

The procedure is carried out in the manner described in Example 1 except for the following modifications:

2. Instead of 2 g there is added 3 g of p-chlorosulfophenyl-maleimide to the adhesive component: mixture B—an addition of 1% of di-tert-butyl-p-cresol as stabiliser increases the storage stabilits of mixture B considerably: mixture B.
3. Instead of 2 g of p-chlorosulfophenyl-maleimide, there are used 1 g of p-chlorosulfophenyl-maleimide and 1 g of γ-methacryloxypropyltrimethoxy silane ("Silan A 174"): mixture C.
4. Instead of 1 g of ethylene glycol dimethacrylate, there is used 1 g of butylene glycol dimethacrylate: mixture D. The mixture D can also be produced as follows: 54 g of methyl methacrylate, 10 g of methacrylic acid and 2 g of p-chlorosulfophenyl-maleimide are well stirred up at room temperature for 15 minutes. To the mixture are added 1 g of butylene glycol-(1,3)-dimetnacrylate and 0.5 g of cumene hydroperoxide, and the mixture is stirred for 45 minutes at room temperature. There is subsequently added to the mixture 35 g of ABS powder, and stirring is continued for 30 minutes at room temperature. The mixture can be stored cool.
5. To mixture A is additionally added 2 g of a finely ground, weakly acid cation exchanger, a cross-linked methacrylic acid compound having COOH groups ("Amberlite IRC-50"): mixture E.
6. Instead of 35 g of ABS powder, there is used a mixture of 17.5 g of ABS powder and 17.5 g of polystyrene: mixture F.
7. Instead of 54 g of methyl methacrylate, there is used 54 g of ethyl methacrylate, instead of 1 g of ethylene glycol dimethacrylate there is used 1 g of butylene glycol dimethacrylate, and instead of 2 g of p-chlorosulfophenyl maleimide there is used 3 g: mixture G.
8. Instead of 2 g of p-chlorosulfophenyl-maleimide and the accelerator formed from butyraldehyde and aniline, there are used 3 g of p-chlorosulfophenyl-maleimide, i.e. mixture B (see Example 2) and dimethyl-p-toluidine as an accelerator.
9. Mixture B (see Example 2) is used, and to this is also added 2 g of a liquid anion exchanger of the secondary amine type consisting of N-lauryl-N-trialkylmethylamine ("Amberlite LA 2"): mixture H.
10. To mixture D (see Example 4) is also added 10 g of chlorinated paraffin containing 56% of chlorine ("VP Hordaflex SP", Hoechst AG): mixture J.

The tensile shearing strength of test specimens prepared from an aluminium alloy containing magnesium and silicon (Al.alloy) having a ground surface ("Anticorodal") using the mixtures mentioned has, after 24 hours' curing at room temperature, the values in N/mm² shown in Table 5.

TABLE 5

| Example | Mixture | Accelerator | Tensile shearing strength N/mm² |
|---|---|---|---|
| 2 | B | as in Example 1 | 23.1 |
| 2 | B' | " | 21.8 |
| 3 | C | " | 21.3 |
| 4 | D | " | 25.0 |
| 5 | E | " | 26.3 |
| 6 | F | " | 19.9 |
| 7 | G | " | 20.8 |
| 8 | B | dimethyl-p-toluidine | 23.9 |
| 9 | H | as in Example 1 | 24.4 |
| 10 | J | " | 22.5 |

EXAMPLE 11

To mixture D (see Example 4) is also added 5 g of chlorinated paraffin as a vaporisation inhibitor: mixture K. The procedure otherwise is as described in Example 1, with the so-called "open time" being ascertained, that is to say, the time which passes between applying the mixture to the surface of a test strip and pressing the test strip onto the second strip to still obtain adhesion, the extent of which is determined by measuring the tensile shearing strength of the bond after the given "open time". The test specimens used are again strips of Al. alloy; the curing is effected in 24 hours at room temperature. In Table 6 are shown some values obtained using the accelerator 1 (Acc. 1) (=condensation product from 3 mols of butyraldehyde and 1 mol of aniline) and Acc. 2 (=N,N-dimethyl-p-toluidine), respectively, and for comparison the corresponding values using mixture A (Example 1) and the comparative mixture V 1 (see Example 1).

TABLE 6

| | | Tensile shearing strength values(N/mm$^2$) "Open time" (minutes) | | | | | |
|---|---|---|---|---|---|---|---|
| | Accelerator | 1 | 3 | 5 | 10 | 15 | 20 |
| mixture K | Acc. 1 | 20.1 | 20.5 | 22.5 | 15.5 | 18.9 | 15.9 |
| mixture K | Acc. 2 | 26.0 | 25.2 | 22.8 | 21.1 | 23.9 | 22.6 |
| mixture A | Acc. 1 | 24.9 | 15.0 | 11.1 | 11.1 | 9.2 | 6.9 |
| V 1 | Acc. 1 | 14.8 | 13.8 | 6.8 | 6.6 | 5.4 | 5.0 |

EXAMPLES 12–17

It is shown in these Examples that specific additives are not capable of impairing the quality of the bonds, and may even enhance it.

The base mixture in all the Examples comprises 35.0 percent by weight of ABS powder, 54.0 percent by weight of methyl methacrylate, 10 percent by weight of methacrylic acid, 1 percent by weight of butylene glycol dimethacrylate, 0.5 percent by weight of cumene hydroperoxide and 3.0 percent by weight of p-chlorosulfophenyl-maleimide. Various acids and anhydrides are added in amounts of 2 g.

The accelerator used is usually Acc. 1 but in one case it is Acc. 2. The test specimens consist of Al. alloy strips; curing is effected during 24 hours at room temperature. The tensile shearing strength values are given in Table 7.

TABLE 7

| Example | 2 g of additive to the base nixture | Accelerator | Tensil shearing value (N/mm$^2$) |
|---|---|---|---|
| 12 | maleic acid | Acc. 1 | 23.7 |
| 13 | fumaric acid | Acc. 1 | 23.1 |
| 14 | succinic acid | Acc. 1 | 22.2 |
| 15 | tartaric acid | Acc. 1 | 23.7 |
| 16 | maleic anhydride | Acc. 1 | 25.0 |
| | " | Acc. 2 | 25.0 |
| 17 | B$_2$O$_3$ | Acc. 1 | 26.3 |

EXAMPLE 8

Underwater bonding

The mixture A (see Example 1) is spread under water over the one part of the specimen, and the accelerator (Acc. 1) is applied, also under water, to the other part. The two strips are bonded together and cured under water at room temperature. The tensile shearing strength values in N/mm$^2$ are shown in Table 8, wherein also the corresponding values given by the comparative mixture are listed.

TABLE 8

| Substrate | Curing time | Tensile shearing strength N/mm$^2$ |
|---|---|---|
| Al.alloy, ground | 1 h | 6.1 |
| Al.alloy, ground | 24 h | 19.5 |
| steel, ground | 1 h | 9.3 |
| steel, ground | 24 h | 13.9 |
| comparative test with mixture V 1 | | |
| Al.alloy, ground | 1 h | 3.2 |
| Al.alloy, ground | 24 h | 7.2 |
| steel, ground | application not possible | |

EXAMPLE 19

In this Example is described the adhesive action of two different adhesives without accelerator, and the results are compared with those obtained using the comparative mixture (designated as V 1 in Example 1) as a one-component system and also with the addition to it of "accelerator 808" as the accelerator.

The following mixtures according to the invention are used:

Mixture D 35 g of ABS powder is dissolved in a mixture of 54 g of methyl methacrylate and 10 g of methacrylic acid at room temperature. To the homogeneous emulsion is added 2 g of p-chlorosulfophenyl-maleimide and the whole is stirred for 2 hours. There is subsequently added 1 g of butylene glycol dimethacrylate, and the mixture is stirred for a further 3 hours at room temperature. Finally, 0.5 g of cumene hydroperoxide is added to the mixture and this is again stirred for 3 hours.

Mixture K

To mixture D is added 5 g of chlorinated paraffin as vaporisation inhibitor.

Procedure

The mixtures D, K and V 1 and also V 1 plus accelerator are applied to test specimens in the manner described in Example 1. The surface of the metal strips can be ground, oiled or degreased. Unlike the procedure in Example 1, both metal strips are provided with the adhesive (the accelerator is not used except in the case of the one comparative test). Immediately after being coated, the strips are pressed together, secured with clamps, and then cured for 1 hour at room temperature and for a further hour at 100° C. The tensile shearing strength is then measured in N/mm$^2$. The results are summarised in Table 9.

TABLE 9

| Adhesive | Substrate | Tensile shearing strength N/mm$^2$ |
|---|---|---|
| D | Al.alloy, ground | 21.3 |
| D | Al.Alloy, degreased | 20.4 |
| D | Al.alloy, oiled | 21.5* |
| D | steel, degreased | 17.2 |
| D | steel, oiled | 12.7 |
| K | Al.alloy, ground | 17.0 |
| K | Al.alloy, degreased | 18.7 |
| K | steel, ground | 17.2 |
| K | steel, oiled | 17.8 |
| V 1 | Al.alloy, ground | - (delaminated) |

TABLE 9-continued

| Adhesive | Substrate | Tensile shearing strength N/mm² |
|---|---|---|
| V 1 + Acc. | Al.alloy, ground | 14.8 |

*When the bonded specimen is heated for a further 30 minutes at 240° C., the tensile shearing strength falls to 17.7 N/mm².

EXAMPLE 20

Mixture L 35 g of ABS powder is dissolved in a mixture of 54 g of methyl methacrylate and 10 g of methacrylic acid at room temperature. To the homogeneous emulsion is added 2 g of chlorosulfonaphthyl-(1)-maleimide. After the mixture has been stirred for 2 hours, 1 g of butylene glycol dimethacrylate is added and the mixture is stirred for a further 3 hours at room temperature. There is then added 0.5 g of cumene hydroperoxide, and the mixture is stirred again for 3 hours.

(a) The mixture L is applied in the manner described in Example 1 to a metal strip of ground aluminium alloy; the accelerator (Acc. 1) (formed from 3 mols of butyraldehyde and 1 mol of aniline) is applied to a second such strip.

The two strips are pressed together and curing is effected during 24 hours at room temperature. A tensile strength of 19.7 N/mm² is measured.

(b) If the mixture L is used as a one-component system, the two aluminium alloy metal strips are coated with mixture L alone, and curing is effected during 1 hour at room temperature, then for 1 hour at 100° C. and finally for 30 minutes at 240° C. The tensile strength afterwards is 22.4 N/mm.

EXAMPLE 21

The mixture D (see Example 19) according to the invention is applied, using a laminating hook, twice to both sides of a glass fibre fleece, and dried for 1 hour at room temperature. The thickness of the dry non-sticky film is approximately 0.56 mm. (This film can be stored between polyethylene sheets for several months in a refrigerator without its bond strength decreasing.) The film is placed between two test strips, which are then pressed together, and held for one hour at 100° C. The two test strips form a test specimen having an overlap of 12.5 mm×25.0 mm.

The tensile shearing strength of various specimens is shown in the following Table 10.

TABLE 10

| Substrate (metal ground) | Tensile shearing strength N/mm² | Observation |
|---|---|---|
| copper | 12.7 | |
| brass | 6.1 | |
| galv. iron | 12.9 | |
| steel | 14.2 | |
| glass | 9.6 | material fracture |
| acrylic glass | 12.6 | material fracture |
| Al/ABS/Al | 6.5 | material fracture |
| polycarbonate | 8.7 | |
| wood | 6.3 | |
| wood/steel | 10.1 | |
| Al/rubber/Al | 3.3 | material fracture |
| steel/glass | 6.1 | material fracture |
| SMC (= sheet moulding compounds) | 13.2 | |

EXAMPLE 22

With mixture D is produced, in the manner described in Example 21, a film and this is applied to a specimen prepared from etched aluminium alloy. The test specimen is subsequently held at 100° C. for 1 hour. A peel strength measurement according to DIN 53 289 of 11.0 N/mm is then made. With use of an unsupported film prepared from the mixture D, the specimen gives a peel strength value of 15.8 N/mm.

EXAMPLES 23 to 28

In the following Examples, the given adhesion promoters are stirred into a mixture in each case of 35 g of ABS (acrylonitrile-butadiene-styrene terpolymer), 54 g of methyl methacrylate, 10 g of methacrylic acid, 1 g of butylene glycol dimethacrylate and 1 g of cumene hydroperoxide. The mixture is then applied to a strip of ground steel, and bonded with a further steel strip on which the accelerator (Acc.1) has been applied, in the manner described in Example 1. Table 11 shows the tensile shearing strength of the specimens cured at room temperature for 15 minutes, 1 hour and 24 hours, respectively.

TABLE 11

| Ex. | Adehsion promoter | Amount g | Tensile shearing strength in N/mm² after | | |
|---|---|---|---|---|---|
| | | | ¼h | 1 h | 24 h |
| 23 | N-acetylsulfanyl chloride | 1.73 | 6.5 | 12.2 | 19.7 |
| 24 | succinimidobenzylsulfochloride | 0.71 | 7.5 | 13.9 | 19.1 |
| 25 | 2-phthalimidoethane-sulfochloride | 0.72 | 5.4 | 13.6 | 19.2 |
| 26 | benzylmaleimidesulfochloride | 2.1 | 12.5 | 12.7 | 18.6 |
| 27 | o-tolylmaleimidesulfochloride | 2.0 | delamin. | 12.1 | 23.0 |
| 28 | p-tolylmaleimidesulfochloride | 2.0 | delamin. | 13.7 | 19.0 |
| comparison: without adhesion promoter | | | delaminated | delaminated | 11.2 |

EXAMPLE 29

There is used mixture M which differs from mixture D in that it contains 0.9 g in place of 0.5 g of cumene hydroperoxide. 2 g of polyethylene powder (high-pressure polyethylene, for example COATHYLENE-P 50, having a melting range of 116°–119° C. and a density of 0.935, marketed by Plast-Labor S.A., Bulle) is added, and the mixture is stirred for 1 hour at room temperature. Using the accelerator Acc.1, a ground aluminium strip is bonded with polyethylene sheet (P-Tex N-100) pretreated with corona discharges. After 15 minutes at 100° C., the peel strength obtained is 7.1 N/mm.

What is claimed is:

1. An adhesive or adhesive component containing 30 to 80 percent by weight of at least one polymerisable acrylate or methacrylate monomer and 10 to 50 percent by weight of at least one diene-containing vinyl polymer, as well as 0.05 to 10 percent by weight of a compound producing free radicals, which adhesive or adhesive component contains, as adhesion promoter, 0.1 to 15 percent by weight of an acid amide or imide which is substituted on the nitrogen atom by a chlorosulfonated alkyl, aryl or aralkyl group, and which corresponds to the formula I

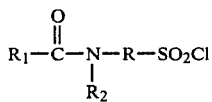

in which R is an alkylene group having 1 to 25 carbon atoms, or a substituted or unsubstituted phenylene, naphthylene or phenylenealkylene group having 1 to 4 carbon atoms in the alkylene moiety, $R_1$ and $R_2$ are each hydrogen or an alkyl group having 1 to 4 carbon atoms, or $R_1$ and $R_2$ together with the

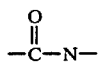

group form a heterocyclic ring which can be saturated or unsaturated and can be substituted by 1 or 2 methyl groups and which, in addition to the N atom given in the formula I, contains no further hetero atom in the ring, with the percentage values being calculated relative to the adhesive or adhesive component.

2. An adhesive or adhesive component according to claim 1, wherein $R_1$ and $R_2$ in the formula I together with the

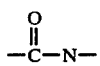

group form the maleimide group which is unsubstituted or substituted by 1 or 2 methyl groups.

3. An adhesive or adhesive component according to claim 2, wherein R in the formula I is the phenyl group.

4. An adhesive or adhesive component according to claim 1, which contains as said polymerizable monomer, methyl or ethyl acrylate or methyl or ethyl methacrylate.

5. An adhesive or adhesive component according to claim 1, which contains as said diene-containing vinyl polymer, an acrylonitrile-butadiene-styrene terpolymer, a butadiene-styrene copolymer, or an isoprene-styrene copolymer.

6. An adhesive or adhesive component according to claim 1, which contains an organic peroxide or hydroperoxide as the compound producing free radicals.

7. An adhesive or adhesive component according to claim 1, which contains 5 to 20 percent by weight, relative to the adhesive component, of a further adhesion promoter.

8. An adhesive or adhesive component according to claim 1 or 6, which contains 0.1 to 10 percent by weight, relative to the adhesive or adhesive component, of a crosslinking agent, a vaporisation inhibitor, a stabiliser, an adhesion promoter, an epoxide resin or a pigment.

9. An ahesive or adhesive component according to claim 8, which contains a dimethacrylate as the crosslinking agent.

10. An adhesive or adhesive component according to claim 8, which contains a chlorinated paraffin as the vaporisation inhibitor.

11. An adhesive or adhesive component according to claim 1, which contains as said diene-containing vinyl polymer an acrylonitrilebutadiene-styrene terpolymer and as adhesion promoter p-chlorosulfophenyl-maleimide.

12. An adhesive or adhesive component according to claim 1, which contains as said diene-containing vinyl polymer an acrylonitrilebutadiene-styrene terpolymer and as adhesion promoter chlorosulfonaphthyl-(1)-maleimide.

13. An adhesive or adhesive component according to claim 1, which contains as said diene-containing vinyl polymer an acrylonitrilebutadiene-styrene terpolymer and as adhesion promoter N-acetylsulfanyl chloride.

14. An adhesive or adhesive component according to claim 1, which contains as said diene-containing vinyl polymer an acrylonitrilebutadiene-styrene terpolymer and as adhesion promoter chlorsulfophenyl-succinimide.

15. An adhesive or adhesive component according to claim 1, which contains as said diene-containing vinyl polymer an acrylonitrilebutadiene-styrene terpolymer and as adhesion promoter chlorsulfobenzyl-maleimide.

* * * * *